Nov. 7, 1950 C. E. LOMAX 2,529,402

SELECTOR SWITCH IN AUTOMATIC TELEPHONE SYSTEMS

Filed Feb. 12, 1947 2 Sheets-Sheet 1

INVENTOR.
CLARENCE E. LOMAX
BY
Chas. W. Candy
ATTORNEY

Nov. 7, 1950 C. E. LOMAX 2,529,402

SELECTOR SWITCH IN AUTOMATIC TELEPHONE SYSTEMS

Filed Feb. 12, 1947 2 Sheets-Sheet 2

INVENTOR.
CLARENCE E. LOMAX
BY
Chas. Th. Candy
ATTORNEY

Patented Nov. 7, 1950

2,529,402

UNITED STATES PATENT OFFICE 2,529,402

SELECTOR SWITCH IN AUTOMATIC TELEPHONE SYSTEMS

Clarence E. Lomax, Chicago, Ill., assignor to Automatic Electric Laboratories, Inc., Chicago, Ill., a corporation of Delaware Application February 12, 1947, Serial No. 728,184

8 Claims. (Cl. 179—18)

This invention relates in general to automatic switches in automatic telephone systems and more particularly to improved and novel pulsing circuit arrangements.

The object of this invention is to provide a novel pulsing circuit which will operate more efficiently in systems which are subject to a large variation in line conditions and dial speeds.

A feature of the invention is the manner in which the line relay is supplied with a restoring force on the initial pulse of a series which is of greater value than that supplied for the remaining pulses of the series.

A further feature of the invention is the manner in which a three winding electropolarized line relay, an impedance, and a condenser are arranged to aid the line relay in more uniform operation over a large range of line conditions and dial speeds.

Another feature of the invention is the manner in which a three winding electropolarized line relay, a series relay, and a release relay are arranged so that the release relay is controlled by the series relay under certain line conditions and is controlled by the line relay under other line conditions.

Still another feature of the invention is the manner in which a three winding electropolarized line relay is connected in the arrangement whereby two of the windings are energized over the line to operate the relay and the third winding is energized over a pair of energizing circuits responsive to operation of the line relay.

A further feature of the invention is the manner in which the vertical magnet is pre-energized to effect quicker operation and a longer pulse only on the first pulse of the series.

Another feature of the invention is the manner in which the opposing winding of the electropolarized relay is connected in series with the release relay whereby the impedance of the release relay is used as an aid to better operation of the line relay when certain line conditions are present.

An additional feature is the manner in which a single winding relay is connected in the battery searching selector to at times furnish battery over the C lead to a preceding switch and at other times to provide a holding circuit for itself and for the vertical magnet.

Figure 1:
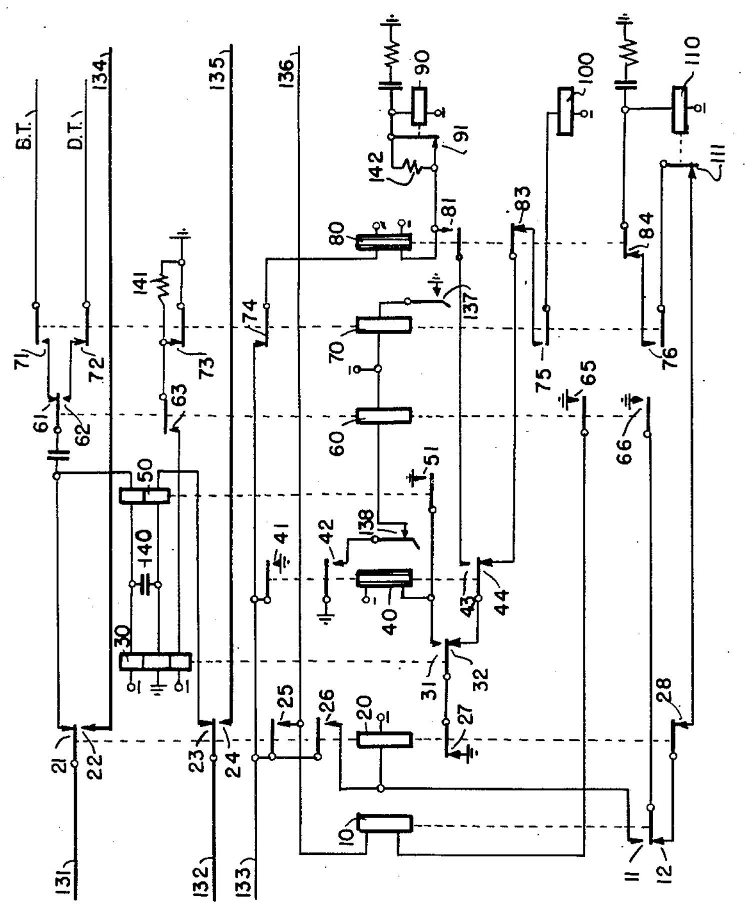
Figure 2:
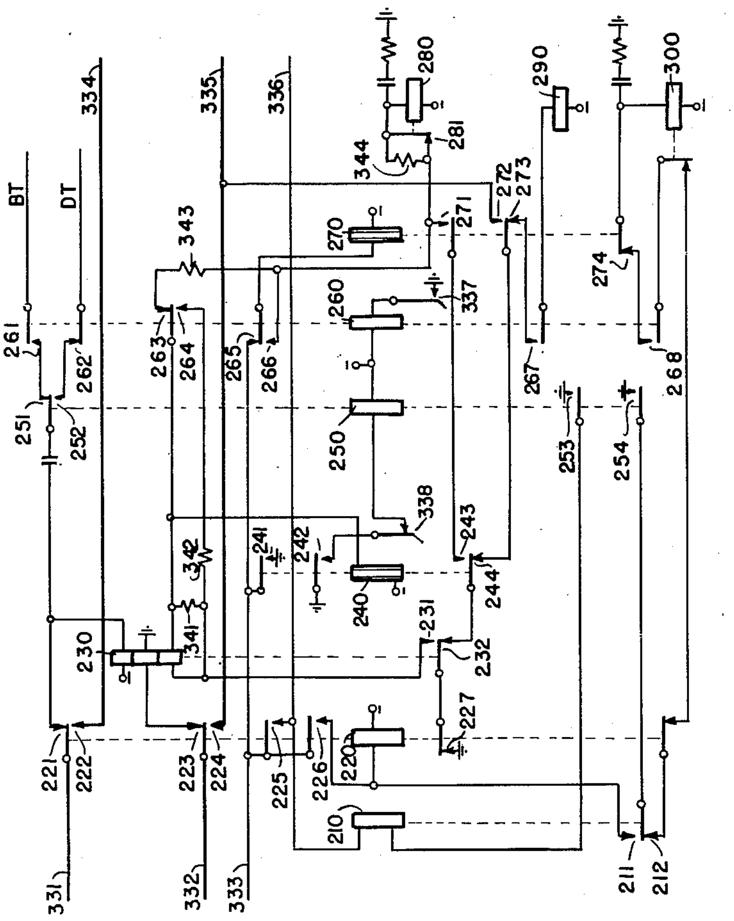

The invention both as to its organization and method of operation together with further objects and advantages thereof will best be understood by reference to the following specification and accompanying drawings composed of Figures 1 and 2.

Figure 1 illustrates an automatic selector switch which incorporates the features of the applicant's invention. The selector comprises incoming connections 131, 132, and 133 and is controlled by impulses, received over these conductors to position the wipers 134, 135 and 136 opposite a desired group of bank contacts in a well known manner.

The battery searching selector consists essentially of a well known Strowger vertical and rotary switch, having off normal springs 137 and cam springs 138 used in conjunction with a novel circuit arrangement for controlling the testing relay 10, switch through relay 20, electropolarized line relay 30, series relay 50, release relay 40, cam slave relay 60, off normal relay 70, changeover relay 80, vertical magnet 90, release magnet 100, and rotary magnet 110, their associated contacts and connections.

Figure 2 illustrates an automatic selector switch which is similar to the selector shown in Figure 1 and illustrates a modified pulsing circuit arrangement.

The selector comprises incoming connections 331, 332, 333 and is controlled by impulses received over these conductors to position the wipers 334, 335 and 336 in a well known manner opposite a desired group of bank contacts.

The battery searching selector consists essentially of a well known Strowger vertical and rotary switch, having off normal springs 337 and cam springs 338 used in conjunction with a novel circuit arrangement for controlling the testing relay 210, switch through relay 220, electropolarized line relay 230, release relay 240, cam relay 250, off normal relay 260, changeover relay 270, vertical magnet 280, release magnet 290, rotary magnet 300, impedances 341, 342, and 343, and the relay associated contacts and connections.

Referring now to Figure 1, the operation of the line relay 30, condenser 140 and impedance relay 50 in combination will be fully described at this point. The use of a condenser across a line relay has been disclosed in applicant's Patent 1,674,652 issued June 26, 1928.

It is a well known fact that whenever there are many ringers bridged across the line the normal pulsing circuits experience trouble in effecting quick release of the pulsing relay when the dial springs are opened. Tests of applicant's arrangement utilizing an electropolarized relay, adjusted to operate in series with 2500 ohm resistance as the line relay with a 3000 ohm leak to ground show that the line relay will pulse with an 8 to 12 pulse per second dial. This relay is of the three winding type, a pair of the windings effective on energization over the line to operate the relay. Obviously the only reason that a line relay will release with a leak this heavy in the circuit is because of the discharge of the condenser 140 in parallel with the line relay which is aiding the relay in its release. Condenser 140 is normally charged by the local circuit to 48 volts—the normal supply voltage of the system. When the selector is seized, the dial springs being closed, the voltage will drop to approximately 30 volts. When the dial springs are initially opened, the inductive kick of relay 30 charges the condenser 140 to a high voltage of approximately 700 volts. In a circuit arrangement which does not have a condenser such as 140, this high voltage is absorbed by the ringer condensers across the line which are in series with the ringer impedance. As a result, the condensers charge slowly and the line relay is slow to release. By inserting condenser 140 across the line as illustrated the relay kick is quickly absorbed and the condenser commences its discharge in sufficient time to aid the line relay in releasing. To further improve the impulsing circuit so that the line relay will release on circuits with a leak of a heavier value than the value required to operate the relay, a third opposition winding has been added to the line relay. This third opposing winding is also effective when there are variations of exchange voltage. In these cases the relay 30 releases more slowly with high voltage, but the restoring voltage is also increased and the relay operates as if there were no change of voltage. It is readily seen that the combination of a third opposing winding on the line relay and a condenser across the line is effective for short leaky lines. However, in cases of long dry lines, the line relay is normally operated a minimum amount of time and supplies the B relay 40 with only a portion of its required operating current. At first blush the combination of the condenser and line relay opposing winding would seemingly increase the danger of the release relay releasing during an incoming impulse train. To alleviate this possibility, relay 50 is connected in series with the line relay and operates with the line relay. Relay 50 at its contacts 51 completes a holding circuit for the release relay 40. Relay 50 has very little spring tension and falls back slowly, operates quickly and thereby keeps the circuit to relay 40 closed for a greater percentage of time than line relay 30 does at its contacts 31. The fact that the holding circuit for relay 40 is controlled by relay 50 means that the spring tension on line relay 30 may be adjusted more stiffly, thus further benefiting the vertical magnet where short leaky lines are prevalent. However, relay 50 is also of a beneficial value to long dry lines. It is well known that a line relay needs a stiff adjustment for a zero resistance line. By inserting a resistance in series with a relay the ampere turn operating range of the pulsing relay is reduced. Relay 50 being in nature a resistance in the line means that the operating range will be reduced for the line relay 30 and it will not be necessary to have as stiff an adjustment as is required in a line of zero resistance. Briefly when reduced to numerical values, considering a range of line resistances between zero and 1500 ohms, when there is an artificial resistance of 200 ohms, i. e. relay 50, inserted in series with the line relay, the operating range of ampere turns for the pulsing relay is reduced from approximately 1100 ampere turns to 700 ampere turns and makes possible a line relay adjustment for the narrower operating range. In this manner, long dry lines and the short leaky lines are both benefited by the insertion of relay 50 in the arrangement. The combination of these elements provides a pulsing arrangement suitable for a large variation of line conditions in a system employing dials of a wider range of speeds. The condenser 140 normally does not delay operation of either of the relays 30 or 50 as it is fully charged by the local circuit. The drop in voltage across condenser 140 when the dial springs are closed may delay operation of relay 50 slightly, but it is not of importance as relay 30 at its contacts 31 holds relay 40 during this delay period.

It will now be assumed that the selector is seized over the incoming connections 131 to 133. A loop circuit is thereby closed for line relay 30 and series relay 50. Ground is connected to relay 80 over contacts 74 over conductor 133. Relay 80 operates and at its contacts 81 prepares a self-holding circuit and a circuit to the vertical magnet 90. Relay 30 operates and at its contacts 31 completes a circuit over contacts 27 to relay 40. Relay 50 operates and at its contacts 51 completes a multiple circuit to relay 40. Relays 30 and 50 operate quickly. Relay 40 operates and at its contacts 41 completes an auxiliary holding circuit for relay 80 over contacts 74 and places ground on conductor 133 to hold the previous switch, at its contacts 42 completes a circuit to cam relay 60, and at its contacts 43 further prepares the secondary holding circuit to relay 80 and an operating circuit to vertical magnet 90. Relay 60 operates and at its contacts 63 completes the energizing circuit for the third winding of relay 30 over contacts 73 and 63. This winding is in opposition to the first and second windings of the line relay. Relay 60 at its contacts 61 applies dial tone to conductor 131, at its contacts 65 prepares a circuit for relay 10, at its contacts 66 prepares a point in the circuit for relay 20. The selector is now prepared for receipt of a series of impulses over the incoming conductors, relays 30, 40, 50, 60 and 80 being in the energized condition.

On receipt of the first break of the first impulse, relays 30 and 50 restore. Relay 50 has little or no residual spacing and very little spring tension so that it will fall back slowly, operates quickly and increases the percentage of time that the operating circuit to relay 40 is held closed. It is readily seen therefore that relay 30 may be adjusted to give a maximum amount of time for holding an operating circuit closed to relay 80 and the magnet 90. This is especially valuable when used on short leaky lines where the pulsing relay would ordinarily not fall back long enough to energize the vertical magnet. It is a well known fact that the first impulse to the vertical magnet in the selector is normally shorter because the pulsing relay having been energized for a considerable time is slow to release. It will be noticed that the operating circuit over contacts 73 and 63 for the third winding of relay 30 is arranged so that a maximum amount of current is supplied to the opposition third winding during the first pulse received and is effective therefore to cause line relay 30 to release as quickly on receipt of the first break impulse as it does on subsequent break impulses. Line relay 30 releases on receipt of the first break of the first impulse and at its contacts 31 opens the operating circuit to relay 40 and at its contacts 32 completes an operating circuit to vertical magnet 90 over contacts 27, 32, 43, 81 and 91. Vertical magnet 90 operates and elevates wipers 134 to 136 one step whereby they are positioned in a well known manner opposite the first level of bank contacts on the associated contact field. Vertical magnet 90 at its contacts 91 inserts resistance 142 in the vertical magnet operating circuit at the end of the stroke. The purpose of this resistance is to weaken the magnet energizing circuit near the end of the stroke so that the armature will restore more quickly when long pulses are received over long dry lines. Incident to this first vertical step, the vertical off normal springs 137 are closed and an operating circuit is completed over said springs to relay 70. Relay 70 operates and at its contacts 72 removes dial tone from the line, at its contacts 73 inserts resistance 141 in the operating circuit for the third winding of line relay 30. In this arrangement the pulsing relay is connected so that the third winding of relay 30 receives a certain current on the first pulse, and less current on subsequent pulses, the pulsing relay thereby restoring as quickly for the first pulse as it does for the remaining pulses. Relay 70 at its contacts 74 opens the energizing circuit to relay 80 over contacts 74, 81, 43, 32 and 27, at its contacts 75 prepares a point in the operating circuit to release magnet 100, and at its contacts 76 prepares a point in the operating circuit to rotary magnet 110.

The vertical magnet elevates the wipers a number of levels relative to the number of impulses received. Relays 40 and 80 are slow to release and remain operated during the series of incoming impulses.

A short period after the cessation of the impulses of the first digit, relay 80 releases due to the prolonged opening of its circuit at contacts 32 over which relay 30 has been intermittently energized during the impulse series; and at its contacts 81 opens the operating circuit to the vertical magnet, at its contacts 83 closes a further point in the circuit to release magnet 100, and at its contacts 84 closes a self interrupting operating circuit to rotary magnet 110 over contacts 66, 12, 28, 111, 76 and 84. If all trunk lines on the selected level are busy, the switch wipers 134, 135, and 136 will be stepped in a well known manner to the eleventh position whereupon the cam springs 138 are operated to open the operating circuit to relay 60. Relay 60 releases and at its contacts 61 applies busy tone to the line 131 over contacts 71, 61 and 21. The calling party on receipt of the busy tone restores which opens the operating circuits to relays 30 and 50. Relays 30 and 50 release and at their respective contacts 31 and 51 open the holding circuit to relay 40. Relay 40 on releasing at its contacts 44 completes an operating circuit to release magnet 100 over contacts 27, 32, 44, 83, and 75. Magnet 100 operates and releases the switch thereby opening the operating circuit to relay 70. Relay 70 restores and the switch is prepared for a subsequent call.

If the selected level is not busy, the switch will stop rotating when the wiper 136 finds an idle trunk with battery potential marked thereon. An operating circuit will then be completed for relay 10 over contacts 65. Relay 10 operates and at its contacts 11 completes an operating circuit for relay 20 over contacts 66, and at its contacts 12 opens the operating circuit to rotary magnet 110. The rotary motion of the switch is thereby stopped. Relay 20 operates and at its contacts 21 and 23 opens the operating circuit to relays 30 and 50, at its contacts 22 and 24 connects lines 131 and 132 to 134 and 135, at its contacts 25 extends the C lead through the selector, at its contacts 26 closes a temporary holding circuit for itself over contacts 41 and 26, at its contacts 27 opens a further point in the release magnet circuit and at its contacts 28 opens a further point in the rotary magnet circuit.

Relays 30 and 50 restore and at their respective contacts 31 and 51 open the circuit to relay 40. Relay 40 at its contacts 42 opens the holding circuit to relay 60. Relay 60 releases and at its contacts 65 and 66 opens the operating circuits to relays 10 and 20. Relays 20 and 70 remain energized during the completed connection, relay 20 being maintained in the energized condition by a ground returned over wiper 136 from a succeeding switch.

Release of the switch is effected in a normal manner. When the calling party hangs up ground is removed from conductor 136 and relay 20 releases. Relay 20 at its contacts 27 completes an operating circuit to release magnet 100 over contacts 27, 32, 44, 83, and 75. Release magnet 100 operates and effects release of the selector switch in a well known manner. Off normal springs 137 thereupon open the circuit to off normal relay 70, which releases and at its contacts 75 opens the operating circuit to release magnet 100. The release magnet restores and the selector is returned to normal.

With reference to Figure 2, it will now be assumed that the selector there illustrated is seized over the incoming conductors 331 to 333. A loop circuit is thereby closed for electropolarized line relay 230 over contacts 221 and 223 and incoming lines 331 and 332. Line relay 230 operates and at its contacts 231 completes a circuit to release relay 240 over contacts 227, 231 and low resistance 341 in multiple with lower winding of relay 230. In arrangements which have long dry lines connected to the incoming selector leads, relay 240 is normally robbed of much of its holding circuit current due to the short period of time the line relay is energized. Resistance 341 is inserted across the lower winding of the line relay 230 in order to provide relay 240 with a larger current than it would receive if it were connected directly in series with the opposing winding of line relay 230.

The advantages of an opposing winding have been previously disclosed with reference to Figure 1. In addition to the previously listed merits, the opposing winding absorbs the high inductive kick of the line relay caused on opening of the dial springs. This delays operation of the line relay on long dry lines and insures longer pulses to the release relay. In the case where a short leaky line condition is prevalent, the inductive kick will be completely absorbed by the time the line relay is being restored and no delay is experienced.

Relay 230 at its contacts 231 also completes a pre-energizing circuit to the vertical magnet 280 for the first pulse over contacts 227, 231, 263, resistance 343, and 281. It is well known that a pulsing relay becomes saturated before the first pulse of a series is sent, and that the sending dial is faster on the start of a series than it is on the last of a series of impulses. Therefore the magnets get less closure time on the first pulse than they do on subsequent pulses. A pre-energizing circuit to the vertical magnet will obviously effect quicker operation of the magnet and a longer first operation thereof. The two supply sources for the opposition winding further aid the circuit by increasing the restoring force of the winding to line relay 230 on the initial pulse. It should be noted that after the opposition winding has aided restoration of relay 230, the circuit is opened at contacts 231 so that the opposing winding is not operative when the line relay is further operated over the incoming leads.

Ground was connected to relay 270 over contacts 265 over conductor 333 from a preceding switch. Relay 270 operated and at its contacts 271 prepared a self holding circuit and a point in the operating circuit to vertical magnet 280. Relay 270 is a single winding relay which is fully energized before pulsing is initiated and is connected in parallel with the magnet. Its winding is also used to connect battery to the C lead 333 for stopping the previous switch. Relay 240 operates and at its contacts 241 completes a multiple circuit for relay 270 through contacts 265, and places ground on conductor 333 to hold the previous switch, at its contacts 242 completes an operating circuit to cam relay 250, and at its contacts 243 further prepares the secondary holding circuit to relay 270 and an operating circuit to vertical magnet 280. Relay 250 operates and at its contacts 252 applies dial tone to conductor 331 over contacts 221, and at its contacts 253 and 254 prepares the circuits for relays 210 and 220. The circuit is now prepared for receipt of a series of impulses over the incoming conductors, relays 230, 240, 250 and 270 being in the energized condition and impedance 341 inserted in the operating circuit of relay 240.

On receipt of the first break of the first impulse, relay 230 restores, and at its contacts 231 opens the operating circuit to relay 240, and at its contacts 232 completes an operating circuit to vertical magnet 280 over contacts 227, 232, 243, 271 and 281. Vertical magnet 280 operates quickly due to the preenergizing circuit described heretofore and elevates wipers 334 to 336 inclusive one step whereby they are positioned in a well known manner opposite the first level of bank contacts on the associated contact field. Vertical magnet 280 at its contacts 281 inserts resistance 344 in the vertical magnet operating circuit at the end of its stroke. Incident to this first vertical step, the vertical off normal springs 337 are closed and an operating circuit is completed over the springs to relay 260. Relay 260 operates and at its contacts 262 removes dial tone from the line, at its contacts 263 removes the resistance 343 from the vertical magnet operating circuit and inserts resistance 342 in parallel with the third winding of line relay 230 and in parallel with resistance 341. The removal of resistance 343 from the opposing winding further reduced current flow. Resistance 342 reduces the amount of current which can flow through the third winding of the line relay and thusly reduces the restoring force of the winding after the initial pulse. This feature further overcomes the tendency for the vertical magnet to receive a shorter first pulse as heretofore described.

The remaining circuit in Figure 2 is similar in operation to the selector illustrated in Figure 1, whose operation has been previously disclosed herein.

It will be noted that if the switch is seized over incoming lines 331 to 333 and the calling party releases without dialing, relay 240 will not be held operated through resistance 343. The line relay 230 restores and at its contacts 232 completes a circuit to vertical magnet 280 which effects operation of the vertical off normal relay 260. Relay 260 operates and at its contacts 263 opens the preenergizing circuit to the vertical magnet 280 and thus eliminates the possibility of relay 240 being held up over contacts 263, 271, 243, 232 and 227. It should be noted that the speed of restoration of the line relay, where there are long dry line conditions present, is not increased by the presence of the third winding in the circuit. The time for restoration of the line relay will therefore be more alike on all types of lines in that the third winding is of much benefit on leaky lines and has little effect on long dry lines.

While a particular embodiment of the invention has been described, it will be understood that various modifications may be made therein which are within the true spirit and scope of the invention.

What is claimed is:

1. In an automatic switch having incoming connections over which said switch is seized, an electropolarized line relay having a pair of windings, a first circuit including one of said incoming connections connected to one of said windings for energizing said one winding, means for completing said first circuit to operate said line relay responsive to seizure of said switch over said incoming connections, a second circuit for energizing said other winding, means for completing said second circuit to said other winding in response to the operation of said line relay, a source of current connected in said circuits, said one and other windings of said line relay being wound in opposition and the flux produced by said other winding by the current flow in said second circuit being electromagnetically opposed by the flux produced by said one winding by the current flow in said first circuit, said first means including said first circuit for restoring and reoperating said line relay in response to the receipt of each impulse of a series of switch operating impulses received over said incoming connection from an impulse sender, means including a third circuit for reducing the current flow in said other winding to reduce the opposing flux produced by said other winding, contacts for completing said third circuit, and means for operating said contacts in response to the first impulse of said received series of impulses.

2. In an automatic switch having incoming connections over which said switch is seized, an electropolarized line relay having three windings, an impedance connected in series with a pair of said windings and with said incoming connections; a first circuit including said incoming connections, said impedance and said pair of windings for operating said relay, means for completing said first circuit to operate said relay in response to the seizure of said switch over said connections, a second circuit for energizing the third of said windings, means for completing said second circuit to said third winding in response to the operation of said line relay, a source of current connected in said circuits, said third winding being wound in opposition to said pair of windings and the flux produced by said third winding by the current flow in said second circuit being electromagnetically opposed by the flux produced by said pair of windings by the current flow in said first circuit, said first means including said first circuit for restoring and reoperating said line relay in response to the receipt of each impulse of a series of switch operating impulses received over said incoming connections from an impulse sender, means including a third circuit for reducing the current flow in said third winding to reduce the opposing flux produced by said third winding, means for completing said third circuit in response to the first impulse of said series, a condenser connected in bridge across said pair of windings in said first circuit, said condenser being charged by the inductive kick from said pair of windings when said first circuit is opened and quickly discharging through said pair of windings to aid said line relay in quicker restoration for said series of received impulses, and said impedance limiting the current flow in said pair of windings over said first circuit to enable said third winding to more quickly restore said line relay.

3. In an automatic switch connected to an incoming line having short leaky line conditions at times and over which said switch is seized, an electropolarized line relay connected to said line, an auxiliary relay connected in series with said line relay, a first circuit including said line for operating said line and auxiliary relays, means for completing said first circuit to operate said relays in response to the seizure of said switch over said line, a release relay, a second circuit for operating said release relay, first circuit closing means for completing said second circuit to operate said release relay in response to the operation of said line relay, another operating circuit for operating said release relay, another circuit closing means for completing said other circuit to operate said release relay in response to the operation of said auxiliary relay, means including said first circuit for restoring and reoperating said line relay in response to the receipt of each impulse of a series of switch operating impulses received over said incoming line from an impulse sender, an operating magnet, an operating circuit for said magnet, said first circuit closing means restored in response to the first of said impulses received for completing said magnet operating circuit to operate said magnet, said other circuit closing means and said other operating circuit for said release relay effective to maintain said release relay operated for a short interval after restoration of said first circuit closing means, and means for adjusting the operate time of said line relay to delay the reoperation of said first circuit closing means by said line relay to give a longer pulse to said magnet as an aid whenever short leaky line conditions are present on said line.

4. In an automatic switch connected to incoming connections over which said switch is seized, an electropolarized line relay having three windings with a pair of said windings connected to said incoming connections, a first circuit including said incoming connections and said pair of windings for operating said relay, means for completing said circuit to operate said relay in response to the seizure of said switch over said connections, an energizing circuit having a pair of branches for energizing said third winding of said line relay, means for completing said energizing circuit to said third winding over said pair of branches in response to the operation of said line relay, a source of current connected in said circuits, said third winding being wound in opposition to said pair of windings and the flux produced by said third winding by the current flow in said energizing circuit being electromagnetically opposed by the flux produced by said pair of windings by the current flow in said first circuit, said first means including said first circuit for restoring and reoperating said line relay in response to the receipt of each impulse of a series of switch operating impulses received over said incoming connections from an impulse sender, means for opening one of said branches in response to the receipt of the first impulse of said series, and means including the other of said branches for reducing the current flow through said third winding to thereby reduce said opposing flux for the remaining impulses of said series.

5. In an automatic switch as claimed in claim 4, a resistance, a circuit for connecting said resistance in parallel with said winding to the other of said branches to further reduce said current flow through said third winding, and contacts for completing said last mentioned circuit closed responsive to said first impulse.

6. In an automatic switch terminating an incoming line, a line relay having a pair of windings, a line relay circuit including one of said windings connected to said incoming line for operating said relay completed to operate said relay in response to the seizure of said switch over said incoming line, an operating magnet, a preenergizing circuit including the other of said relay windings and contacts controlled by said relay, means including said preenergizing circuit completed by the operation of said relay for partially energizing said magnet without operating said magnet, said line relay circuit being interrupted by each impulse of a series of switch operating impulses transmitted over said incoming line fom an impulse sender, means for restoring said line relay each time said line relay circuit is interrupted, and an operating circuit completed by the restoration of said line relay and including other contacts controlled by said line relay for operating said magnet.

7. In an automatic switch terminating an incoming line, an electropolarized relay having three windings, a line relay circuit including a pair of said windings connected to said incoming line for operating said relay completed to operate said relay in response to the seizure of said switch over said incoming line, an operating magnet, a preenergizing circuit including the third of said relay windings for partially energizing said magnet without operating said magnet, means operated by said relay for completing said preenergizing circuit in response to the operation of said relay, said line relay circuit being interrupted by each impulse of a series of switch operating impulses transmitted over said incoming line from an impulse sender and said relay restoring each time said line relay circuit is interrupted, a source of current in said circuits, said third winding being wound in opposition to said pair of windings and the flux produced by said third winding by the current flow in said preenergizing circuit being electromagnetically opposed by the flux produced by said pair of windings by the current flow in said line relay circuit to assist in quickly restoring said relay, additional means included in said preenergizing circuit, and means for operating said additional means to open said preenergizing circuit operated responsive to the first restoration of said relay in response to the receipt of the first impulse of said series.

8. In an automatic switch terminating an incoming line, a line relay having a pair of windings, a line relay circuit including one of said windings connected to said incoming line for operating said relay completed to operate said relay in response to the seizure of said switch over said incoming line, an operating magnet, a preenergizing circuit completed by the operation of said relay and including the other of said relay winding for partially energizing said magnet without operating said magnet, said line relay circuit being interrupted by each impulse of a series of switch operating impulses transmitted over said incoming line from an impulse sender and said line relay restoring each time said line relay circuit is interrupted, an operating circuit completed by each restoration of said relay to operate said magnet, additional means included in said preenergizing circuit, and means for operating said additional means to open said preenergizing circuit responsive to the operation of said magnet.

CLARENCE E. LOMAX.

REFERENCES CITED

The following references are of record in the file of this patent:

UNITED STATES PATENTS

| Number | Name | Date |
|---|---|---|
| 1,465,393 | Goodrum | Aug. 21, 1923 |
| 1,864,955 | Stokely | June 28, 1932 |
| 2,023,011 | Dunham | Dec. 3, 1935 |
| 2,210,876 | Beale | Aug. 13, 1940 |